US008229731B2

(12) United States Patent
Chen et al.

(10) Patent No.: US 8,229,731 B2
(45) Date of Patent: Jul. 24, 2012

(54) SYSTEMS AND METHODS FOR FAST AND MEMORY EFFICIENT MACHINE TRANSLATION USING STATISTICAL INTEGRATED PHASE LATTICE

(75) Inventors: Stanley Chen, Port Jefferson, NY (US); Yuqing Gao, Mount Kisco, NY (US); Bowen Zhou, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 12/824,806

(22) Filed: Jun. 28, 2010

(65) Prior Publication Data

US 2010/0256973 A1    Oct. 7, 2010

Related U.S. Application Data

(60) Division of application No. 12/132,791, filed on Jun. 4, 2008, now Pat. No. 7,797,148, which is a continuation of application No. 11/431,894, filed on May 10, 2006, now abandoned.

(51) Int. Cl.
*G06F 17/28* (2006.01)
(52) U.S. Cl. .................. 704/4; 704/2; 704/277
(58) Field of Classification Search .......... 704/1–10, 704/277, 251–255, 270, 257
See application file for complete search history.

(56) References Cited

OTHER PUBLICATIONS

Kumar et al. "A Weighted Finite State Transducer Translation Template Model for Statistical Machine Translation" Natural Language Engineering, 2004.*

S. Bangalore et al., "A Finite-State Approach to Machine Translation", North American Chapter of the Assoc. for Computational Linguistics; 2001; 8 pages.
P. F. Brown et al., "The Mathematics of Statistical Machine Translation: Parameter Estimation", Computational Linguistics, 19(2); 1993; pp. 263-311.
T. Hori et al., "Fast On-The-Fly Composition for Weighted Finite-State Transducers in 1.8 Million-Word Vocabulary Continuous Speech Recognition"; Proc. Int'l Conf of Spoken Language Processing, Jeju, Korea, Sep. 2004; 4 pages.
S. Kanthak et al., "A Comparison of Two LVR Search Optimization Techniques" Int'l Conf. of Spoken Language; 2002; 4 pages.
S. Kanthak et al., "Novel Reordering Approaches in Phrase-Based Statistical Machine Translation", ACL 2005 Workshop on Building and Using Parallel Tests: Data-Driven Machine Translation and Beyond; Ann Arbor, MI; Jun. 2005; 8 pages.
S. Kumar et al., "A Weighted Finite State Transducer Translation Template Model for Statistical Machine Translation", Journal of Natural Language Engineering, 11 (3); 2005; pp. 1-41.
M Mohri et al., "Weighted Finite-State Transducers in Speech Recognition" Computer Speech and Language; 16 (1); 2002; pp. 69-88.
F. J. Och et al., "Improved Alignment Models for Statistical Machine Translation"; Proc EMNLP/VLC '99; MD, US; 1999; pp. 20-28.

(Continued)

*Primary Examiner* — Huyen X. Vo
(74) *Attorney, Agent, or Firm* — Tutunjian & Bitetto, P.C.; Anne V. Dougherty, Esq.

(57) ABSTRACT

A phrase-based translation system and method includes a statistically integrated phrase lattice (SIPL) (H) which represents an entire translational model. An input (I) is translated by determining a best path through an entire lattice (S) by performing an efficient composition operation between the input and the SIPL. The efficient composition operation is performed by a multiple level search where each operand in the efficient composition operation represents a different search level.

7 Claims, 5 Drawing Sheets

OTHER PUBLICATIONS

K. Papineni et al., "Bleu: A Method for Automatic Evaluation of Machine Translation"; Proc. of the 40th Annual Meeting of the Assoc. for Computational Linguistics (ACL), Philadelphia, Jul. 2002; pp. 311-318.

R. Zens et al., "Improvements in Phrase-Based Statistical Machine Translation" Proc. HLT/NAACL '04; Boston, MA; May 2004; 8 pages.

B. Zhou et al., "Constrained Phrase-Based Translation Using Weighted Finite State Transducer", Proc. ICASSP '05; 2005; 4 pages.

F. Casacuberta et al., "Machine Translation with Inferred Stochastic Finite=State Transducers", Assoc. for Computational Linguistics; 30(2):2004; pp. 205-255.

K. Knight et al., "Translation with Finite-State Devices", 4th Conference of the Assoc. for Machine Translation in the Americas; 1998; pp. 421-437.

P. Koehn et al., "Statistical Phrase-Based Translation" North American Chapter of the Assoc. for Computational Linguistics/Human Language Technologies; 2003; 7 pages.

* cited by examiner

SYSTEMS AND METHODS FOR FAST AND MEMORY EFFICIENT MACHINE TRANSLATION USING STATISTICAL INTEGRATED PHASE LATTICE

RELATED APPLICATION INFORMATION

This application is a Divisional of co-pending U.S. patent application Ser. No. 12/132,791 filed on Jun. 4, 2008, incorporated herein by reference in its entirety, which in turn is a Continuation Application from U.S. patent Ser. No. 11/431,894 filed on May 10, 2006, incorporated herein by reference in its entirety.

GOVERNMENT RIGHTS

This invention was made with Government support under Contract No.: NBCH2030001 awarded by Defense Advanced Research Projects Agency (DARPA) The Government has certain rights in this invention.

BACKGROUND

1. Technical Field

The present invention relates to language translation systems and more particularly to a phrase-based translation system built within a finite state transducer (FST) framework that achieves high memory efficiency, high speed and high translation accuracy.

2. Description of the Related Art

The need for portable machine translation devices has never been more apparent; however, existing methods for statistical machine translation generally require more resources than are readily available in small devices.

One of the applications for machine translation is a handheld device that can perform interactive machine translation. However, the great majority of research in machine translation has focused on methods that require at least an order of magnitude more resources than are readily available on e.g., personal digital assistants (PDAs).

The central issue in limited-resource statistical machine translation (SMT) is translation speed. Not only are PDA's much slower than PC's, but interactive applications require translation speeds at last as fast as real time. In practice, it may be difficult to begin translation until after a complete utterance has been entered (e.g., because speech recognition is using all available computation on the PDA). In this case, translation speeds of much faster than real time are needed to achieve reasonable latencies.

Various translation methods have been implemented in the prior art using weighted finite-state transducers (WFSTs). For example, Knight et al in "Translation with Finite-State Devices", $4^{th}$ AMTA Conference 1998, describe a system based on word-to-word statistical translation models, Bangalore et al. in "A Finite-State Approach to Machine Translation", NAACL 2001, use WFST's to select and reorder lexical items for the translation. More recently, in, the present inventors in Zhou et al. "Constrained Phrase-Based Translation Using Weighted Finite-State Transducers", Proc. ICASSP '05, 2005, describe a constraint-phrase based translation system using WFST's, where a limited number of frequent word sequences and syntactic phrases are re-tokenized in the training data. Kumar et al. in "A Weighted Finite State Transducer Translation Template Model for Statistical Machine Translation", Journal of Natural Language Engineering 11(3), 2005, implement a phrase-based approach of the alignment template translation models using WFSTs.

In the prior art, a desirable way to handle translation using the WFST scheme is to first build a search hypothesis transducer by composing component translation models, and secondly, the input sentence to be translated is represented as a FSA (finite state acceptor), which is composed with the transducer as a common practice. Finally, the translation is the best path in the composed machine.

However, a phrase-based translation implemented in the previous studies is not able to be composed into a static lattice offline due to practical memory constraints. In order to make the chain composition computationally tractable, some of the key component transducers have to be collapsed into smaller machines through online composing with the given input. For example, in Kumar et al., the integrated transducers have to be built specifically for a given input, achieved by a sequence of composition operations on the fly.

A significant disadvantage of such previous studies is the heavy online computational burden, and the loss of advantages of the FST approach that optimal algorithms can be applied offline for improved performance. As a result, the computational speeds of these schemes are significantly slower than those of phrase-based systems not using FST's. Previous FST systems translate at a speed around 10 words or less per second compared to the typical speeds that lie between 100 and 1600 words per second for full blown computers.

SUMMARY

Advantageously, embodiments of the present invention enable the building of a phrase-based translation system developed within a FST framework that achieves a high speed that is as fast as between about 4,000 and 7,000 words per second while maintaining high translation accuracy. This permits making statistical machine translation (SMT) practical for small devices.

A phrase-based translation system and method includes a statistically integrated phrase lattice (SIPL) (H) which represents an entire translational model. An input (I) is translated by determining a best path through an entire lattice (S) by performing an efficient composition operation between the input and the SIPL. The efficient composition operation is performed by a multiple level search where each operand in the efficient composition operation represents a different search level.

A phrase-based translation method includes providing a statistically integrated phrase lattice (SIPL) (H) which represents an entire translational model, and translating an input (I) by determining a best path through an entire lattice (S) by performing an efficient composition operation between the input and the SIPL, wherein the efficient composition operation is performed by a multiple level search where each operand in the efficient composition operation represents a different search level.

In alternate methods, the SIPL includes multiple finite state transducers computed separately and prior to the translating step. The finite state transducers may include at least one language model (L) and at least one translation model (M). The at least one translation model (M) may be computed offline, wherein the at least one translation model includes a word-to-phrase sequencer (P), a phrase translation transducer (T), a target language phrase-to-word transducer (W). A statistically integrated phrase lattice (SIPL) may include a chain of conditional probabilities wherein portions of the chain include finite state machines. The finite state machines preferably include determinizable transducers.

In still other methods, translating includes performing a state traversal search across the entire lattice (S) wherein each of multiple levels of the multiple level search is searched simultaneously. The multiple levels for the multiple level search may include a level for the input (I), and at least one level for the SIPL. The multiple levels may include a level for the input (I), a level for a translation model and a level for language model. The best path may be determined based on negative log probability cost. The translating may further include merging active search states of two or more of the input (I), the language model (L) and the translation model (M) when the states are identical. Pruning states to balance between speed and accuracy may be performed.

The methods described herein are preferably run on a portable device, and the portable device can have less than 20 MB of operating memory. A computer program product may be provided comprising a computer useable medium including a computer readable program, wherein the computer readable program when executed on a computer causes the computer to perform a phrase-based translation method as described herein.

A method for training a phrase-based translation model includes extracting bilingual phrase pairs from utterances and estimating translation probabilities of the bilingual pairs to create an inventory of bilingual phrase pairs, and creating a statistically integrated phrase lattice (SIPL) (H) using the inventory of bilingual phrase pairs to represent an entire translational model which includes a plurality of weighted finite state transducers (WFSTs) including at least a language model (L) and a translation model (M) against which an input may be compared to translate phrases.

In other embodiments, the translation model (M) includes a word-to-phrase sequencer (P), a phrase translation transducer (T), and a target language phrase-to-word transducer (W). The entire translational model is preferably computed offline and stored in a portable device. A computer program product may be provided comprising a computer useable medium including a computer readable program, wherein the computer readable program when executed on a computer causes the computer to train a phrase-based translation model as described herein.

A phrase-based translation system includes a statistically integrated phrase lattice (SIPL) (H) stored in memory which represents an entire translational model. A translation module is configured to translate an input (I) by determining a best path through an entire lattice (S), the translation model being configured to perform an efficient composition operation between the input and the SIPL, wherein the efficient composition operation is performed by a multiple level search where each operand in the efficient composition operation represents a different search level.

The system may be run on a portable device, and the portable device may include less than 20 MB of operating memory for performing the translation, and the entire translational model may be stored in less than 100 MB.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
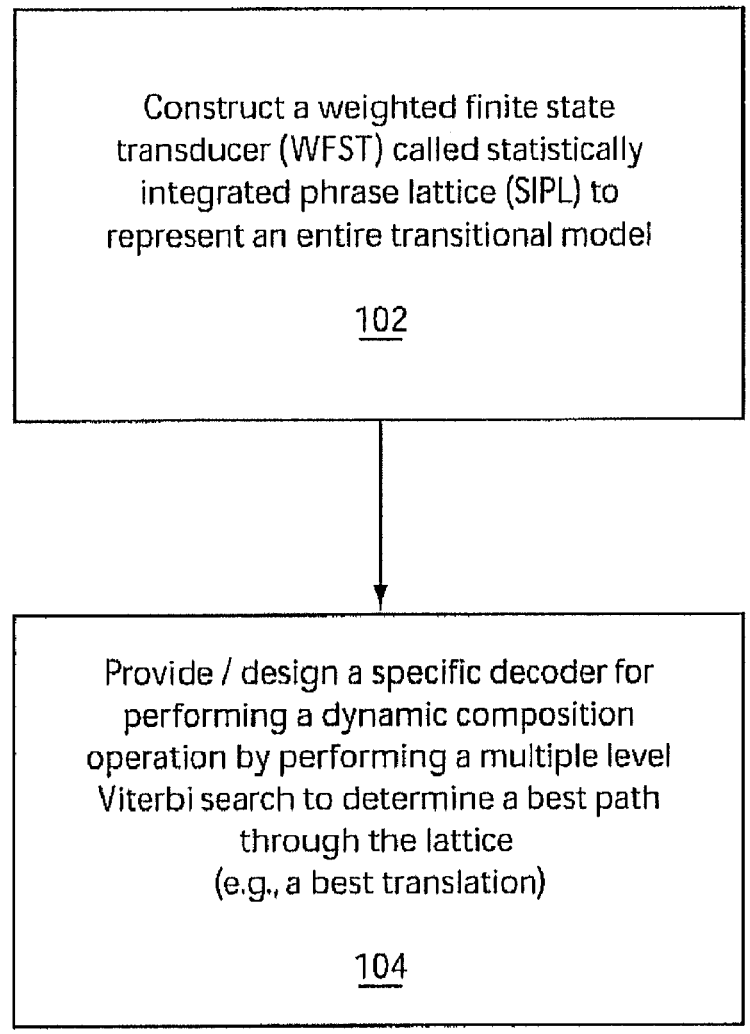
FIG. 1 is a flow/block diagram showing a high level method/system for translating phrases in accordance with an illustrative embodiment.

In accordance with aspects of present embodiments, a new phrase-based statistical machine translation framework is provided. A Statistical Integrated Phrase Lattice (SIPL) is constructed that is statically optimized using weighted finite-state transducer's (WFST's) algorithms and avoids the commonly used on-the-fly composition applied in previous related studies of the prior art. Furthermore, a new decoding method has been developed for this framework.

Combining these advantages, the translation system built upon this framework achieves very fast translation speed yet produces high translation accuracy. In addition, the architecture and decoding method have the advantage of better memory efficiency, and high portability for varied computational platforms.

In this work, a novel framework for performing phrase-based statistical machine translation is provided using weighted finite-state transducers (WFST's) that is significantly faster than existing frameworks while still being memory-efficient. In particular, the entire translation model is represented with a single WFST that is statically optimized, in contrast to previous work that represents the translation model that must be composed on the fly. While the language model is dynamically combined with the translation model, a new decoding algorithm is described that can be viewed as an optimized implementation of dynamic composition or efficient composition. Using these techniques, a machine translation system that can translate at least 500 words/second has been developed on a PDA device while still retaining excellent accuracy. The translation system is evaluated on two bidirectional translation tasks, one for English-Chinese, and one for English and a dialect of Arabic.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram is illustratively shown for a general embodiment. In particularly useful embodiments described herein, a phrase-based translation framework using WFST's is provided that addresses the issues described above. In block 102, in this framework, which will be referred to as Statistical Integrated Phrase Lattices (SIPL's) for simplicity, a single optimized WFST is statically constructed encoding an entire translational model. E.g., all transducers are constructed offline in some specific way, which enables the composition of all component machines into the Statistical Integrated Phrase Lattice (SIPL), H, with optimization algorithms such as, e.g., determinization and/or minimization, applied.

In block 104, a specific decoder (e.g., a specialized Viterbi decoder) is designed to translate source sentences which completely avoid the need for online composition. This Viterbi decoder can combine the translational model (e.g., a translation model and a language model) FST's with the input lattice extremely efficiently using an optimized dynamic composition operation, resulting in translation speeds of, e.g., 4000 words/second on a PC and 800 words/seconds on a PDA device.

A phrase-based statistical machine translational model or multiple models are implemented in accordance with one embodiment using weighted finite-state transducers (WFST's). Phrase-based statistical translation models have shown clear advantages over word-based models. In contrast to most word-level statistical machine translation, phrase-based methods explicitly take word context into consideration when translating a word. By comparing several schemes for computing phrase-level correspondences, it is noted that all of the phrase-level methods consistently outperform word-based approaches.

Meanwhile, finite-state methods can be applied in a wide range of speech and language processing applications. More importantly, automatic speech recognition (ASR) may employ WFST-based decoding methods, which can be significantly faster than other types of systems. A WFST-based approach provides the availability of mature and efficient algorithms for general purpose decoding and optimization that can facilitate the translation task. Adopting the notation introduced by Brown et al. in "The Mathematics of Statistical Machine Translation: Parameter Estimation", Computational Linguistics, 19(2); pages 263-611; (1993), the task of statistical machine translation is to compute a target language word sequence $\hat{e}$ given a source word sequence $f_1^J$ as follows:

$$\hat{e} = \underset{e_1^I}{\mathrm{argmax}} Pr(e_1^I \mid f_1^J) \qquad (1)$$

$$= \underset{e_1^I}{\mathrm{argmax}} Pr(f_1^J \mid e_1^I) Pr(e_1^I)$$

in WFST-based translation, the above computation is expressed in the following way:

$$\hat{e} = \text{best-path}(S = I \circ M_1 \circ M_2 \circ \ldots \circ M_m) \qquad (2)$$

where S denotes the full search lattice, I denotes the source word sequence expressed as a linear finite-state automaton, the $M_i$ are component translation models, and '$\circ$' represents the composition operation. That is, it is possible to express the models used in equation (1) in terms of a sequence of WFST's.

In automatic speech recognition (ASR), it can been shown that this computation can be made much faster by computing $M^* = M_1 \circ M_2 \circ \ldots \circ M_m$ offline and by applying determinization and minimization to optimize the resulting machine.

Because of the large number of phrases used in typical translation systems, previous WFST-based implementations of phrase based SMT were unable to compute the entire M* as a single FST due to computational issues. Instead for these systems, M* is expressed as the composition of at least three component transducers (two for the translation model Pr(f∪e) and one for the language model Pr(e)) and these component transducers are composed on the fly for every input sentence I. There are several significant disadvantages to this scheme, namely the large memory requirements and heavy online computational burden for each individual composition operation, and the loss of the benefits from doing static optimization on the resulting transducers.

As a consequence, the translation speeds of existing WFST-based systems are significantly slower than those of other phrase-based SMT systems. For example, some previous FST systems translate at a speed of less than a word per second on a personal computer, which is substantially slower than the speeds of other SMT systems that can be as high as 100 to 1600 words/second or more. These speeds make it infeasible to deploy phrase-based WFST systems for interactive applications.

Translational Models and FST's: While the task of statistical machine translation can be expressed using equation (1), in practice the following decision rule often achieves comparable results:

$$\hat{e} = \underset{e_1^I}{\mathrm{argmax}} Pr(e_1^I \mid f_1^J) Pr(e_1^I) \qquad (3)$$

As this formulation has some practical advantages, equation (3) will be employed instead of equation (1) in the illustrations herein. Phrase-based translation models explicitly take word contexts into consideration when making a translation decision. Therefore, the foreign word sequence is segmented into K phrases, $\tilde{f}_1^K$, where $1 \leq K \leq J$, and each "phrase"

here simply indicates a consecutive sequence of words. e is the target language word sequence. Then:

$$Pr(e_1^I \mid f_1^J) = \sum_{K, \bar{f}_1^K} Pr(e_1^I, \bar{f}_1^K, K \mid f_1^J) \quad (4)$$

By approximating the maximum sum in equation (4), the translation model can be expressed as a chain of conditional probabilities as follows:

$$Pr(e_1^I \mid f_1^J) Pr(e_1^I) \approx \max_{\bar{f}_1^K} \{ \quad (5)$$

$$P(K \mid f_1^J) P(\bar{f}_1^K \mid K, f_1^J) \times \quad (6)$$

$$P(\bar{e}_1^K \mid \bar{f}_1^K, K, f_1^J) \times \quad (7)$$

$$P(e_1^I \mid \bar{e}_1^K, \bar{f}_1^K, K, f_1^J) \times \quad (8)$$

$$P(e_1^I) \} \quad (9)$$

For simplicity, each line of the equation above will be referred to as a separate equation. The conditional probability distributions in equations (6)-(9) can be represented by finite-state machines (FSM's) that model the relationships between their inputs and outputs. Therefore, the right-hand side of equation (5) can be implemented as a cascade of these machines that are combined using the composition operation. In particular, the translation task can be framed as finding the best path in the following FSM:

$$S = I \circ Det(P) \circ T \circ W \circ L \quad (10)$$

where Det denotes a determinization operation and where the transducers P, T, W and L correspond to equations (6)-(9), respectively. While determinization can be applied to any of the component transducers, the transducers other than P are either already mostly deterministic or nondeterminizable.

In the following section, a description of how a translation models may be trained is provided, and then the construction of each component WFST in equation (10) will be described.

Figure 2:
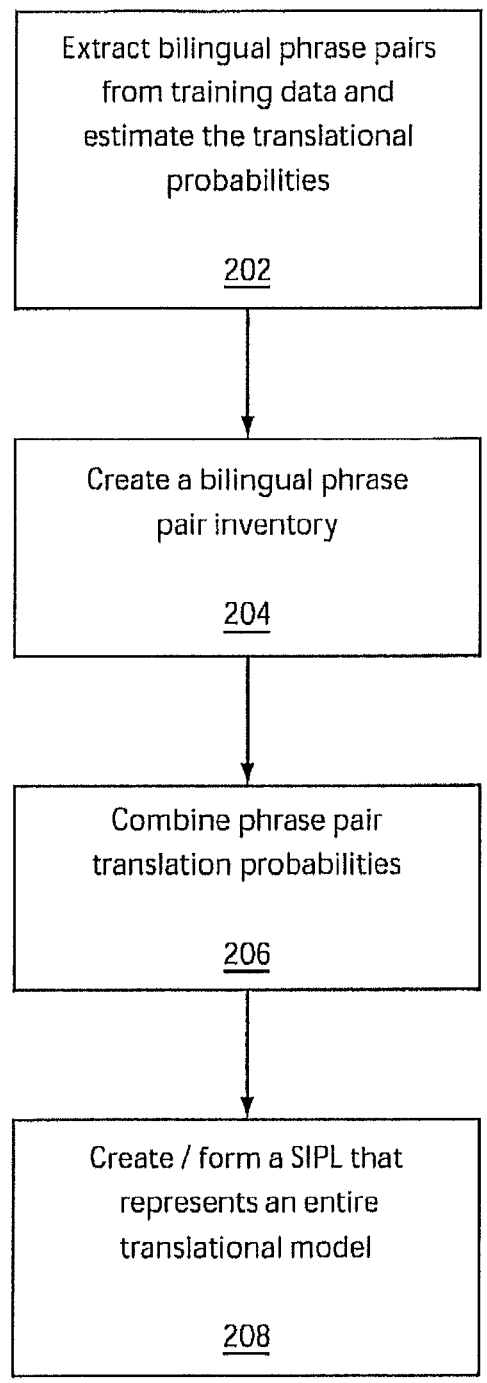
FIG. 2 is a flow/block diagram showing a method/system for training a translational model in accordance with an illustrative embodiment.

Referring to FIG. 2, model training for a translation method will now be described.

Bilingual Phrase Induction and Estimation: One task in phrase-based translation is extracting bilingual phrase pairs and estimating their translation probabilities in block 202. For this step, known procedures may be followed to extract bilingual phrases from training data. (See e.g., Och et al. in "Improved Alignment Models for Statistical Machine Translation", Proc. EMNLP/VLC '99, pages 20-28, MD USA, (1999)). First, bidirectional word-level alignment is carried out on a parallel corpus. Based on the resulting Viterbi alignments $A_{e2f}$ and $A_{f2e}$, the union, $A_U = A_{e2f} A A_{f2e}$, is taken as the symmetrized word-level alignment.

Next, bilingual phrase pairs are extracted from $A_U$ using an extraction algorithm similar to the one described in Och et al. (1999). Specifically, any pair of consecutive sequences of words below a maximum length M is considered to be a phrase pair if its component words are aligned only within the phrase pair and not to any words outside. The resulting bilingual phrase pair inventory is denoted as BP in block 204.

Then, the assumption is made that phrases are mapped from the source language to target language and are not reordered, and that each phrase is translated independently:

$$P(\bar{e}_1^K \mid \bar{f}_1^K) = \prod_{k=1}^{K} P(\bar{e}_k \mid \bar{f}_k) \quad (11)$$

While it is generally sensible to support phrase reordering during translation, this incurs a heavy computational cost and a preliminary investigation suggested that this would have a limited effect on translation accuracy in the domains under consideration. Also note that while it is assumed that each phrase is translated independently, the language model will constrain the translations of neighboring phrases. To estimate the phrase translation probabilities in equation (11), a maximum likelihood estimation (MLE) may be used:

$$P_{MLE}(\bar{e} \mid \bar{f}) = \frac{N(\bar{e}, \bar{f})}{N(\bar{f})} \quad (12)$$

where $N(\bar{f})$ is the occurrence count of $\bar{f}$ and $N(\bar{e},\bar{f})$ is the co-occurrence count of $\bar{f}$ aligning with $\bar{e}$. These counts are all calculated from BP.

An implicit advantage of this type of MLE estimation is that the resulting model will typically favor phrase pairs with longer span, which is desirable as more contexts are included in longer phrases. However, this method will also tend to overestimate the probabilities of long phrases. To address this issue, the MLE probabilities are smoothed using a word-based lexicon that is estimated from word-level Viterbi alignments. For an aligned phrase pair, $\bar{e} = e_{i_1}^{i_2}$ and $\bar{f} = f_{j_1}^{j_2}$, the smoothing distribution $P_s(*)$ may be estimated as:

$$P_s(e_{i_1}^{i_2} \mid f_{j_1}^{j_2}) = \prod_{i=i_1}^{i_2} \left( 1 - \prod_{j=j_1}^{j_2} (1 - P(e_i \mid f_j)) \right) \quad (13)$$

Next, in block 206, the phrase level translation probabilities are combined as:

$$P(e_{i_1}^{i_2} \mid f_{j_1}^{j_2}) = P_{MLE}(\bar{e} \mid \bar{f}) P_s(e_{i_1}^{i_2} \mid f_{j_1}^{j_2})^{\lambda_s} \quad (14)$$

where $\lambda_s \leq 0$ is a smoothing factor that can be tuned. While this is not a properly normalized model, it has been found to work well in practice.

In block 208, a statistically integrated phrase lattice (SIPL) (H) using the inventory of bilingual phrase pairs is created to represent an entire translational model (S) which includes a plurality of weighted finite state transducers (WFSTs) including at least a language model (L) and a translation model (M) against which an input may be compared to translate phrases. It should be understood that the lattice H may include multiple language models and multiple translation models. The translation model (M) may further include a word-to-phrase sequencer (P), a phrase translation transducer (T), and a target language phrase-to-word transducer (W). The entire translational model is preferably computed offline and stored in a portable device. The finite state transducers will now be explained in greater detail.

Source Language Segmentation FST: The source language segmentation transducer, corresponding to equation (6), explores all "acceptable" phrase sequences for any given source sentence. It can be assumed that a uniform distribution exists over all acceptable segmentations, i.e., $$P(K_1 \mid f_1^J) P(\bar{f}_1^{K_1} \mid K_1, f_1^J) = P(K_2 \mid f_1^J) P(\bar{f}_1^{K_2} \mid K_2, f_1^J) \text{ for } \forall K_1, K_2, \bar{f}_1^{K_1}, \bar{f}_1^{K_2}. \quad (15)$$

By "acceptable", it is meant that all phrases in resulting segmentations belong to BP. In addition, the segmentation transducer forces the resulting segmentation to satisfy:

$$\text{concatenation}(\tilde{f}_1, \ldots, \tilde{f}_k) = \tilde{f}_1^J \quad (16)$$

Using the WFST framework, the segmentation procedure is implemented as a transducer P that maps from word sequences to phrases. For example, Kumar et al. (2005) describes a typical realization of P. However, in general, this type of realization is not determinizable, and it is important that this transducer be determinized because this can radically affect translation speed. Not only can determinization greatly reduce the size of this FST, but determinization collapses multiple arcs with the same label into a single arc, vastly reducing the amount of computation needed during search. The reason why a straightforward representation of P is non-determinizable is because of the overlap between phrases found in BP; i.e., a single word sequence may be segmented into phrases in multiple ways. Thus, the phrase identity of a source sentence may not be uniquely determined after the entire sentence is observed, and such unbounded delays make P non-determinizable.

Figure 3:
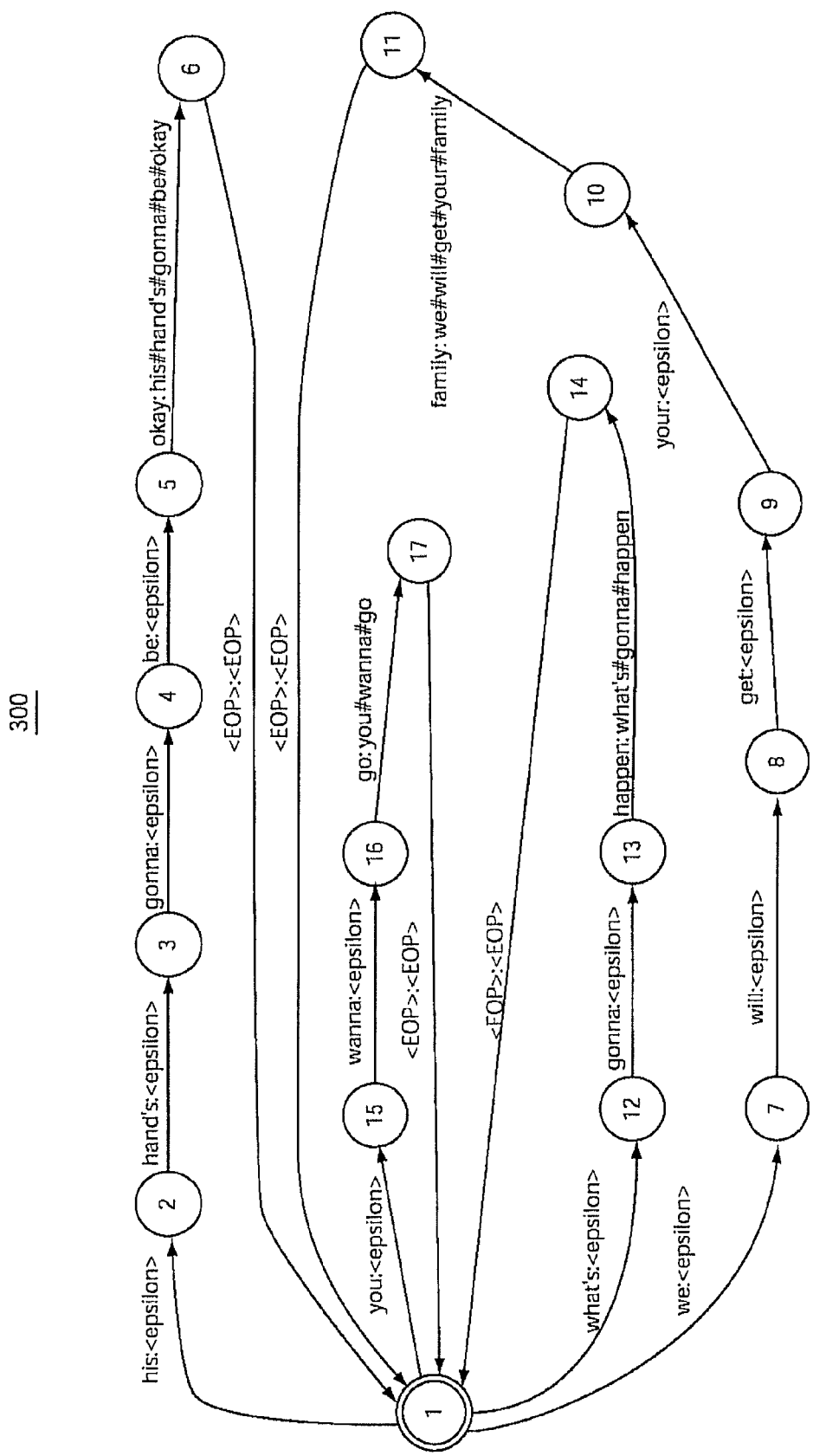
FIG. 3 is a diagram showing an illustrative portion of a source sentence segmentation transducer (P) graph in accordance with an exemplary embodiment.

Referring to FIG. 3, an illustrative graph showing the construction of a portion 300 of transducer P is depicted. Portion 300 includes a plurality of states labeled 1-17, and each arc connecting the states is labeled using the convention of input: output. A token <epsilon> (also referred to hereinafter as epsilon transitions or $\epsilon$-transitions) denotes an empty string and "#" is used as a separator in multi-word labels.

An auxiliary symbol, denoted as EOP, is introduced to mark the end of each distinct source phrase. FIG. 3 shows a sample portion of a resulting transducer. By adding the artificial phrase boundary markers, each input sequence in FIG. 3 corresponds to a single segmented output sequence and the transducer becomes determinizable. Once determinized, the FST can replace the EPO markers with empty strings in a later step, as appropriate. As it is assumed that a uniform distribution exists over segmentations, the cost (or negative log probability) associated with each arc is set to zero.

Phrase Translation Transducer: The phrase translation model, corresponding to equation (7), is implemented by a weighted transducer that maps source phrases to target phrases. Under the assumptions of phrase translation independence and monotonic phrase ordering, the transducer may be a trivial one-state machine, with every arc corresponding to a phrase pair included in BP. The cost associated with each arc is obtained based on equation (14).

To be consistent with the other FST's in equation (10), one more arc is added in this transducer to map EPO to itself with no cost. This transducer is denoted as T.

Target Language Phrase-to-Word FST: After translation, the target phrases can be simply concatenated to form the target translation. However, to constrain translations across phrases, it may be necessary to incorporate the effects of a target language model in the translation system. To achieve this, the target phrases are converted back to target words. It is clear that the mapping from phrases to word sequences is deterministic. Therefore, the implementation of this transducer is straightforward. Again, the auxiliary token EPO is placed on additional arcs to mark the ends of phrases. This transducer is denoted as W, corresponding to equation (8).

Target Language Model: The target language model, corresponding to equation (9), can be represented by a weighted acceptor L that assigns probabilities to target language word sequences based on a back-off N-gram language model (See e.g., Mohri et al., in "Weighted Finite-State Transducers in Speech Recognition", Computer Speech and Language, 16(1) pages 69-88, 2002).

To effectively constrain phrase sequence generation during translation, an N-gram should be of sufficient length to span significant cross-phrase word sequences. Hence, a 5-gram language model is preferably chosen although other N-grams can be selected.

The searching aspect of the present invention will now be described in greater detail.

Issues with Cascades of WFST's: As mentioned, the decoding problem can be framed as finding the best path in the lattice S described in equation (10) given an input sentence/automaton I. Viterbi search can be applied to S to find its lowest-cost path. To minimize the amount of computation needed at translation time, it is desirable to perform as many composition operations in equation (10) as possible ahead of time. In a preferred embodiment, H is computed offline:

$$H = Det(P) \circ T \circ W \circ L \quad (17)$$

At translation time, one needs only to compute the best path of S=I∘H. Applying determinization and minimization to optimize H can further reduce the computation needed. In the field of speech recognition, decoders that fall under this paradigm generally offer the fastest performance. However, it can be very difficult to construct H given practical memory constraints. While this has been done in the past for word-level and constrained phrase-level systems, this has not yet been done for unconstrained phrase-based systems. In particular, the nondeterministic nature of the phrase translation transducer interacts poorly with the language model; it is not clear whether H is of a tractable size even after minimization, especially for applications with large vocabularies, long phrases, and large language models. Therefore, special consideration is needed in constructing transducers for such domains.

Furthermore, even when one is able to compute and store H, the composition I∘H itself may be quite expensive. To improve speed, it has been proposed that lazy or on-the-fly composition be applied followed by Viterbi search with beam pruning. In this way, only promising states in S are expanded on-demand. Nevertheless, for large H (e.g., millions of states and arcs), using such operations from general FSM toolkits can be quite slow.

The Multilayer Search Algorithm (Efficient Composition): While it may not be feasible to compute H in its entirety as a single FSM, it is possible to separate H into two pieces: the language model L and the translation model M:

$$M = Min(Min(Det(P) \circ T) \circ W) \quad (18)$$

where Min denotes the minimization operation.

Due to the determinizability of P, M can be computed offline using a moderate amount of memory. All operations are preferably performed using the tropical semiring as is consistent with Viterbi decoding, e.g., when two path with the same labels are merged, the resulting cost is the minimum of the individual path costs. The cost associated with a transition is taken to be the negative logarithm of the corresponding probability. Minimization is performed following each composition to reduce redundant paths.

To address the problem of efficiently computing I∘M∘L (or I∘H), a multilayer search algorithm has been developed in accordance with the present invention. The basic idea is: that the search is performed in multiple FSM's or layers simultaneously. Specifically, one layer for each of the input FSM's: I, L and M (or H) is included. At each layer, the search process is performed via a state traversal procedure starting from the start state $\vec{s}_0$, and consuming an input word in each step in a left-to-right manner. (Recall that the translation model does not support phrase reordering, only word reordering within phrases.)

This can be viewed as an optimized version of on-the-fly or dynamic composition, and is similar to search algorithms that have been used in large vocabulary speech recognition. This optimized version of composition may be referred to as efficient composition to denote that reduce operational memory is need to perform this operation.

Specialized versions of composition have the advantage of not only being possibly many times faster than general composition implementations found in FSM toolkits, but the specialized versions can also incorporate information sources that cannot be easily or compactly represented using WFST's. For example, the decoder can permit application of translation length penalties and phrase penalties to score the partial translation candidates during search. In addition, the specialized versions can incorporate new parameter values (e.g., language model weight) at runtime without the need for any modification of the input WFST's.

Each state $\vec{s}$ can be represented in the search space using the following 7-tuple: where $(s_I, s_M, s_L, c_M, c_L, \vec{h}, \vec{s}_{prev})$ where $s_I, s_M$ and $s_L$ record the current state in each input FSM; $c_M, c_L$ record the accumulated cost in L and M in the best path up to this point; $\vec{h}$ records the target word sequence labeling the best path up to this point; and $\vec{s}_{prev}$ records the best previous state. The initial search state $\vec{s}_0$ corresponds to being located at the start state of each input FSM with no accumulated costs.

At the beginning of the input sentence I, only the start state $\vec{s}_o$ is active. The active states at each position t in I are computed from the active states in the preceding position t−1 in the following way. For each active state $\vec{s}$ at position t−1, first advance $s_I$. Then, look at all outgoing arcs of $s_M$ labeled with the current input word, and traverse one of these arcs, advancing $s_M$. Then, given the output label o of this arc, look at all outgoing arcs of $s_L$ with o as its input, and traverse one of these arcs, advancing $s_L$. The set of all states $(s_I, s_M, s_L \ldots)$ reachable in this way is the set of active states at position t. The remaining state components $c_M, c_L, \vec{h}$, and $\vec{s}_{prev}$ are updated appropriately, and ε-transitions must be handled correctly as well.

The set of legal translation candidates are those $\vec{h}$ associated with states $\vec{s}$ where each component sub-state is a final state in its layer. The selected candidate is the legal candidate with the lowest accumulated cost.

For each active state, the hypothesis $\vec{h}$ is a translation of a prefix of the source sentence, and can conceivably grow to be quite large. However, we can store the $\vec{h}$'s for each state efficiently using the same ideas as used in token passing in ASR. In particular, the set of all active $\vec{h}$'s can be compactly represented using a prefix tree, and each state can simply keep a pointer to the correct node in this tree. To reduce the search space, two active search states are merged whenever the states have identical $s_I, s_M,$ and $s_L$ values; the remaining state components are inherited from the state with lower cost. In addition, two pruning methods, histogram pruning and threshold or beam pruning, may be employed to achieve the desired balance between translation accuracy and speed. To provide the decoder for a PDA, the search algorithm is preferably implemented using fixed-point arithmetic.

Figure 4:
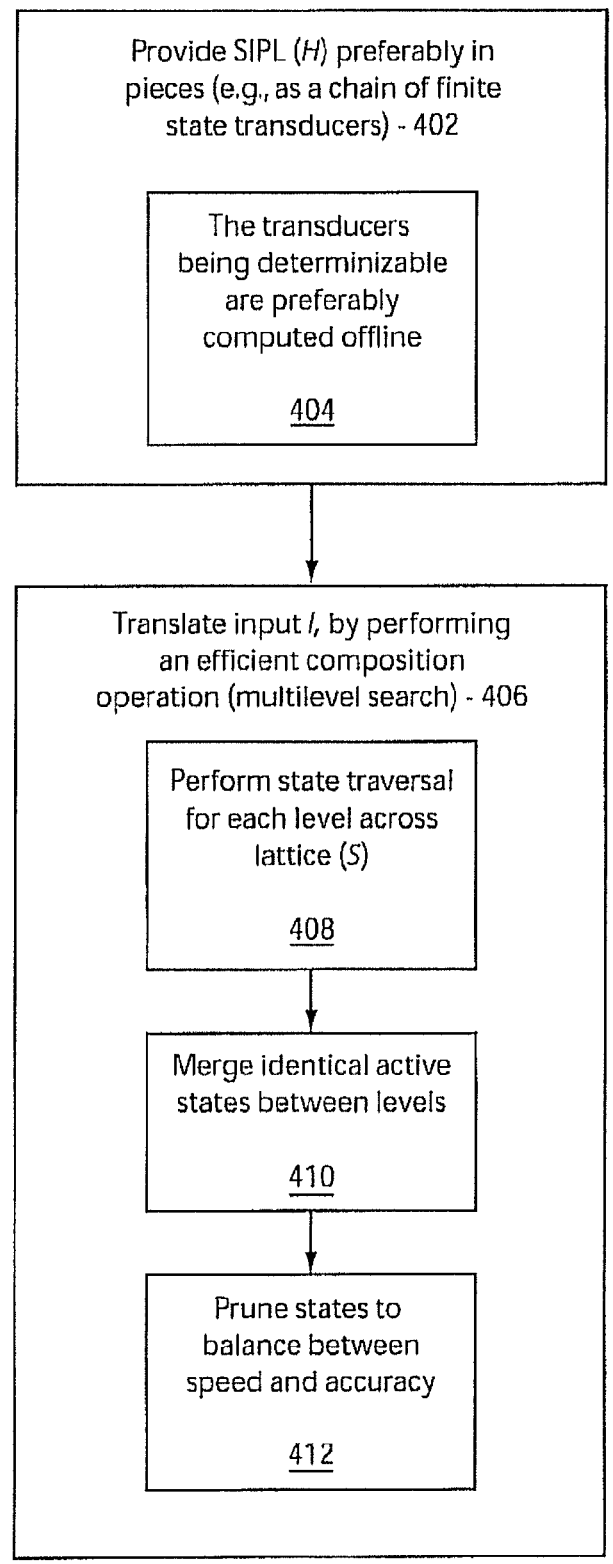
FIG. 4 is a flow/block diagram showing a method/system for translating phrases in accordance with an illustrative embodiment.

Referring to FIG. 4, a phrase-based translation system/method is illustratively depicted summarizing the process described above. In block 402, a statistically integrated phrase lattice (SIPL) or (H) is provided which represents an entire translational model. The SIPL comprises multiple finite state transducers computed separately and offline (e.g., prior to the translation operation). In one embodiment, the SIPL includes a chain of conditional probabilities wherein portions of the chain include finite state machines. The finite state transducers may be determined in pieces. In one preferred embodiment, the SIPL may include a language model (L) and a translation model (M).

In block 404, the SIPL may be computed offline. The SIPL may includes a translation model (M) and a language model (L). The translation model (M) may include a word-to-phrase sequencer (P), a phrase translation transducer (T), and a target language phrase-to-word transducer (W). The finite state machines (transducers) are preferably determinizable transducers.

In block 406, an input (I) is translated by determining a best path through an entire lattice (S) by performing an efficient composition operation between the input and the SIPL, wherein the efficient composition operation is performed by a multiple level search where each operand in the efficient composition operation represents a different search level.

In block 408, translating may include performing a state traversal search across the entire lattice (S) wherein each of the multiple levels is searched simultaneously. The multiple levels may include a level for the input (I), and at least one level for the SIPL. In an alternate embodiment, the multiple levels may include a level for the input (I), a level for a translation model (M) and a level for language model (L). The best path is preferably determined based on cost.

The step of translating may include merging active search states of two or more of the input (I), the language model (L) and the translation model (M) when the states are identical, in block 410. In block 412, pruning states to balance between speed and accuracy may be performed.

Figure 5:
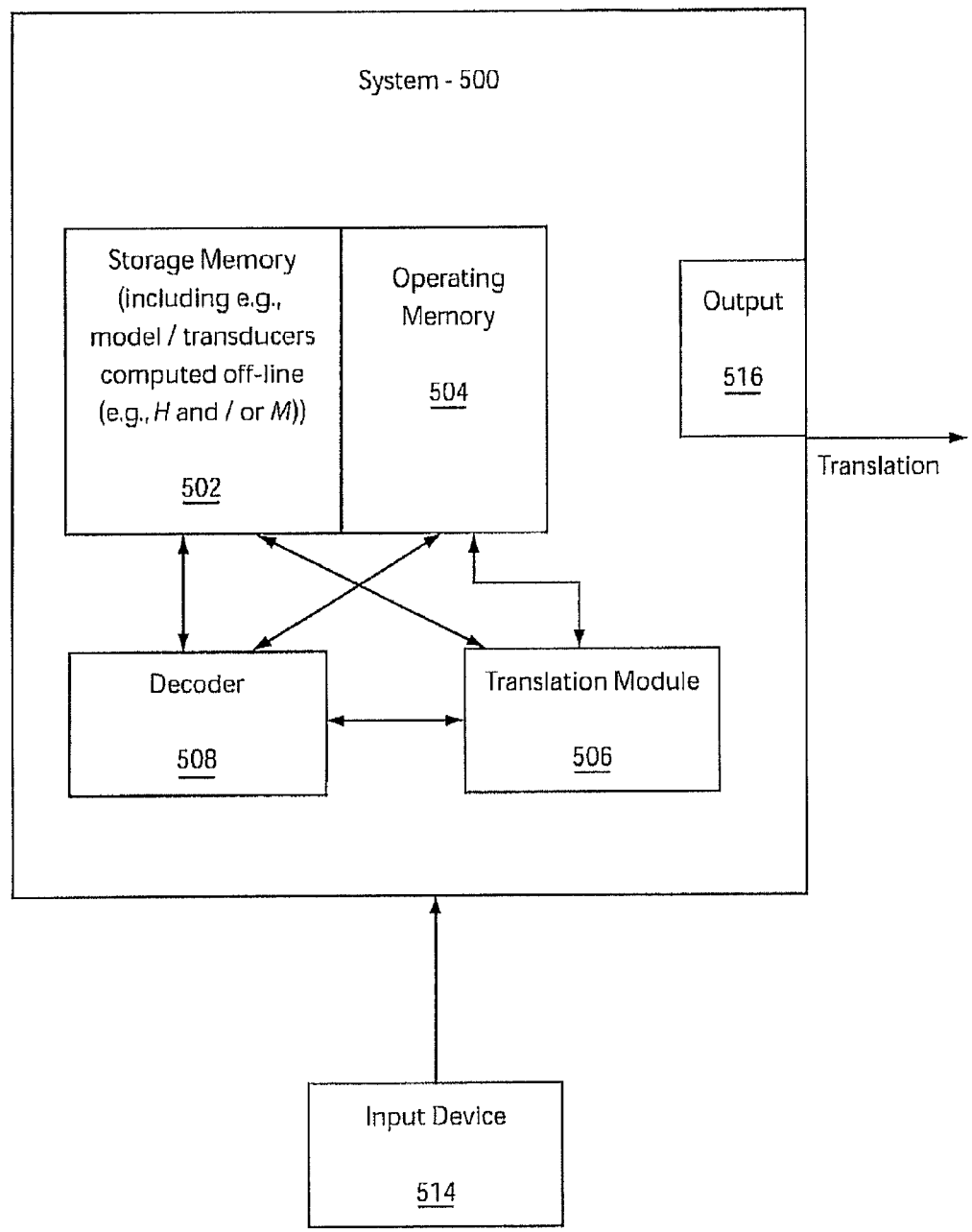
FIG. 5 is a block diagram showing an illustrative system for translating phrases in accordance with an exemplary embodiment.

Referring to FIG. 5, a system 500 is shown in accordance with an illustrative embodiment. System 500 preferably includes a portable computing device, such as a personal digital assistant, a handheld computer, a handheld language translator, or other portable electronic device with sufficient memory to run the translation method described herein and store the translational model. The system 500 may include a full scale system as well, however, the efficiency of the present invention makes it particularly useful in smaller systems where memory space is a premium.

The system 500 includes storage memory 502. Storage memory 502 may include sufficient space to store a precomputed/created translational model (e.g., a statistically integrated phrase lattice (SIPL) or H), which preferably represents an entire translational model. In an alternate embodiment, the storage memory may include sufficient space to store at least a translation model (M). The storage memory 502 may be between about 50 MB to about 200 MB, although more and less memory storage is contemplated. Preferably, storage memory 502 includes less than 100 MB.

System 500 may include a separate memory 504 of e.g., less than 20 MB used for performing translation operations and computations. Memory 504 may be included in memory 502 on a translation module 506 or as a separate unit.

Translation module 506 preferably includes a phrase-based translation module and is configured to translate an input (I) by determining a best path through an entire lattice (S). The translation module 506 is configured to perform a composition operation between the input and the SIPL. The composition operation is performed by a multiple level search performed by a specially designed decoder 508 where each operand in the composition operation represents a different search level.

The decoder 508 may include a specially designed Viterbi decoder configured to perform efficient composition by a multiple level search of the lattice S. The multiple level searches are preferably performed by traversing states in S simultaneously at the input (I) level, and the H level. The H level may also include M and L as described above. If this is the case, than these two levels, M and L, are searched simultaneously with I. The best path (lowest cost) is thereby determined as a result of the search to translate the input utterance/phrase.

The input is received or provided by an input device 514. The input device 514 may include a microphone, keypad, or any other input means to permit speech, text, or other information to be input to the system for translation. Likewise an output module 516 may include a speaker, a printer, a display or any other output device that conveys the translated input.

It should be understood that multiple translational models may be included in system to permit translations to/from a plurality of different language. System 500 may include a user interface to select the type of translation desired. In preferred embodiment, system 500 includes many customizable features and settings.

Experimental Evaluation: The SIPL translation framework in accordance with the present invention was evaluated on two speech translation tasks. The first task is a two-way translation between English and Chinese, and the other is a two-way translation between English and a dialect of colloquial Arabic (DCA). The objective of the speech translation system is to facilitate conversation between speakers of different languages in real time. Thus, both our training and test data are sentences transcribed from spontaneous speech rather than written text.

Corpora and Setup: The majority of the training corpus of the English-Chinese system was collected from simulated English-only doctor/patient interactions, and the dialogs were later translated into Chinese. As Chinese translations may not be representative of conversational Chinese, an additional 6,000 spoken sentences were collected directly from native Chinese speakers, to better capture the linguistic characteristics of conversational Chinese. After being transcribed and translated into English, this data set was also, included in our corpus. In total, there are about 240K utterance pairs but with many repeated utterances.

Several dialogs were randomly selected to form a development set and a test set. No punctuation marks are present in any of the data as it is assumed users exchange information sentence by sentence. For the English-Chinese task, a Chinese segmenter was employed to segment Chinese character sequences into word sequences. Tables 1 and 2 list some statistics of the data sets used for the English-Chinese and English-DCA tasks.

TABLE 1

English-Chinese corpora statistics.

| Data | English | Chinese |
|---|---|---|
| Training set | 240K sentences | |
| | 6.9 words/sentence | 8.4 characters/sentence |
| Vocabulary | 9690 words | 9764 words |
| Dev Set | 300 sentences | 582 sentences |

TABLE 1-continued

English-Chinese corpora statistics.

| Data | English | Chinese |
|---|---|---|
| | 7.1 word/sentence | 8.9 characters/sentence |
| Test Set | 132 sentences | 73 sentences |
| | 9.1 words/sent | 6.2 characters/sent |

TABLE 2

English-DCA corpora statistics.

| Data | English | DCA |
|---|---|---|
| Training set | 366K sentences | |
| | 7.9 words/sentence | 5.4 words/sentence |
| Vocabulary | 24303 words | 79960 words |
| Dev Set | 395 sentences | 200 sentences |
| | 10.4 word/sentence | 6.5 word/sentence |
| Test Set | 1856 sentences | 1856 sentences |

Experimental Results: The maximum phrase length M was set to values between 5 and 9 depending on the language, as listed in Table 3. This table also displays the sizes of the statically constructed translation model WFST's H. While the framework can handle longer spans and larger numbers of phrases, bigger M did not produce significantly better results in this domain, probably due to the short sentence lengths. The development sets were used to adjust the model parameters (e.g., $\lambda_l$ and $\lambda_s$) and the search parameters (e.g., pruning thresholds).

For the results reported in Table 4, all decoding experiments were conducted on a Linux™ machine with a 2.4 GHz Pentium™ 4 processor. The machine used for training (including the SIPL building) possessed a 4 GB memory. Since the decoding algorithm of the SIPL framework is memory efficient, the translation is performed on a machine with 512 MB memory (the actual memory needed is less than 100 MB).

TABLE 3

WFST sizes for various models.

| | States | Arcs | States | Arcs |
|---|---|---|---|---|
| M | English-Chinese | | Chinese-English | |
| | 7 | | 7 | |
| H | 2,293,512 | 3,275,733 | 1,908,979 | 2,777,595 |
| M | English-DCA | | DCA-English | |
| | 5 | | 9 | |
| H | 6,303,482 | 11,086,596 | 8,089,145 | 11,784,418 |

TABLE 4

Translation Performance. The number in parentheses is the number of references used in computing the BLEU score.

| | BLEU (%) |
|---|---|
| English-Chinese (8) | 59.57 |
| Chinese-English (8) | 32.98 |
| English-DCA (2) | 39.83 |
| DCA-English (2) | 50.10 |

Experimental results are presented in Table 4 in terms of the BLEU metric (See, Papineni et al. in "BLEU: A Method for Automatic Evaluation of Machine Translation", Technical Report RC22176, IBM TJ Watson Research Center, 2001). Since the BLEU score is a function of the number of human references, these numbers are included in words parentheses. Note that for English-Chinese translation, BLEU is measured in terms of characters rather than words. It should be understood that the speed of translation in accordance with present embodiments included speeds of hundreds to thousands of words per second. As a point of comparison prior art techniques provide speeds of a few words per second to a few hundred per second at best.

From Table 4 is can be observed that the present approach achieves encouraging results for all four translation tasks. Moreover, using our dedicated translation decoder, all tasks obtained an average decoding speed of higher than, e.g., 1000 words per second. Higher or lower speeds may be achieved based upon the operating conditions and models. For example, the speed varies due to the complexity and structure of the lattices M and L. The fastest speed is achieved for DCA-English translation, where the average speed was, e.g., 4600 words per second. These speeds are competitive with the highest translated speeds reported in the literature. More significantly, the complete system can run comfortably on a PDA or other handheld computing device as part of a complete speech-to-speech translation system.

In this case, the translation component preferably runs in about 20 MB or less of memory, with the FSM's H and L stored on disk (e.g., taking a total of less than several hundred MB's, preferably less than 100 MB) and paged in on demand. In one configuration, the same exact accuracy figures in Table 4 are achieved but at speeds ranging from high hundreds to thousands of words/second. Because of these high translation speeds, SMT contributes almost nothing to the latency in this interactive application.

To the knowledge of the present inventors, these are the first MT results for a handheld device. To give an idea of the difference in speed between our optimized multilayer search as compared to using general on-the-fly composition and pruning operations from an off-the-shelf FSM toolkit, an earlier toolkit-based SMT system was used for comparison that translated at around 2 words/second on comparable domains. While the translation models used are not comparable, this does give some idea of the possible performance gains from using the specialized decoder of the present invention.

TABLE 5

Sample Translation Sentences of the DCA English Task

I just came here to visit my family
sure I understand that that's the way that used to be
how we can know which house
how long do you have my identification
doesn't have any brothers or cousins
we had electricity yes in temporary we had electricity
about twenty meters further away from our house two stories
built with bricks In terms of translation accuracy, Table 5 provides some sample translations produced by a system constructed in accordance with the present invention for the DCA-English task. Note that the focus of the present disclosure is on designing computationally limited machine translation, and it would be unrealistic to expect equivalent performance with systems with no such constraints. To give some perspective, the best reported BLEU results for the Tides evaluation for Modem Standard Arabic to English translation are 51% for Arabic to English. While that data is most likely "harder" than the present case, it does suggest that the present system produces translations of similar quality, albeit on a simpler domain. Thus, the present system is effective for the domain for which it was designed.

Aspects of the present invention include a very fast phrase-based machine translation framework using statistical integrated phrase lattices (SIPL's). This WFST-based approach is well-suited to devices with limited computation and memory. This efficiency is achieved by employing methods that permit performing more composition and graph optimization offline, and utilizing a specialized decoder which performs a multi-layer search. High translation accuracies are achieved in all domains evaluated.

Having described preferred embodiments of systems and methods for fast and memory efficient machine translation using statistical integrated phase lattice (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for training a phrase-based translation model, comprising:
   extracting bilingual phrase pairs from utterances and estimating translation probabilities of the bilingual pairs using a processor to create an inventory of bilingual phrase pairs; and
   creating a statistically integrated phrase lattice (SIPL) (H) using the inventory of bilingual phrase pairs to represent an entire translational model which includes a plurality of weighted finite state transducers (WFSTs) including at least a language model (L) and a translation model (M) against which an input may be compared to translate phrases.

2. The method as recited in claim 1, wherein the translation model (M) includes a word-to-phrase sequencer (P), a phrase translation transducer (T), and a target language phrase-to-word transducer (W).

3. The method as recited in claim 1, wherein the entire translational model is computed offline and stored in a portable device.

4. A computer program product comprising a non-transitory computer useable storage medium including a computer readable program, wherein the computer readable program when executed on a computer causes the computer to train a phrase-based translation model, comprising:
   extracting bilingual phrase pairs from utterances using a processor and estimating translation probabilities of the bilingual pairs to create an inventory of bilingual phrase pairs; and
   creating a statistically integrated phrase lattice (SIPL) (H) using the inventory of bilingual phrase pairs to represent an entire translational model which includes a plurality of weighted finite state transducers (WFSTs) including at least a language model (L) and a translation model (M) against which an input may be compared to translate phrases.

5. A phrase-based translation system, comprising:
   a statistically integrated phrase lattice (SIPL) (H) stored in memory which represents an entire translational model; and a translation module configured to translate an input (I) by determining a best path through an entire lattice (S), the translation model being configured to perform an efficient composition operation between the input and the SIPL, wherein the efficient composition operation is performed by a multiple level search where each operand in the efficient composition operation represents a different search level.

6. The system as recited in claim 5, wherein the system is run on a portable device.

7. The system as recited in claim 6, wherein the portable device includes less than 20 MB of operating memory for performing the translation and the entire translational model is stored in less than 100 MB.

* * * * *